US012570889B2

(12) United States Patent
Al-Yami et al.

(10) Patent No.: US 12,570,889 B2
(45) Date of Patent: Mar. 10, 2026

(54) POLYMER-BASED LATEX FOR CEMENTING FLUIDS

(71) Applicant: Saudi Arabian Oil Company, Dhahran (SA)

(72) Inventors: Abdullah Saleh Hussain Al-Yami, Dhahran (SA); Abdulla Hussein Al-Awadh, Dammam (SA); Nada M. Bokhamsin, Dammam (SA); Abdulaziz Alhelal, Al-Ahsa (SA); Ali Mohammed Hussain Al Safran, Dhahran (SA); Vikrant Wagle, Abqaiq (SA); Ahmed Nabil Al-Dughaither, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/626,095

(22) Filed: Apr. 3, 2024

(65) Prior Publication Data

US 2025/0313743 A1 Oct. 9, 2025

(51) Int. Cl.

| | |
|---|---|
| ***C09K 8/487*** | (2006.01) |
| ***C04B 24/26*** | (2006.01) |
| ***C09K 8/467*** | (2006.01) |
| ***E21B 33/13*** | (2006.01) |

(52) U.S. Cl.

CPC .......... *C09K 8/487* (2013.01); *C04B 24/2623* (2013.01); *C04B 24/2676* (2013.01); *C09K 8/467* (2013.01); *E21B 33/13* (2013.01)

(58) Field of Classification Search

None

See application file for complete search history.

(56) References Cited

U.S. PATENT DOCUMENTS

| | | | | |
|---|---|---|---|---|
| 2,761,843 A | | 9/1956 | Brown | |
| 3,058,520 A | * | 10/1962 | Woodard | C04B 24/2623 524/5 |
| 3,804,058 A | | 4/1974 | Messenger | |

(Continued)

FOREIGN PATENT DOCUMENTS

| | | |
|---|---|---|
| CN | 113912348 | 1/2022 |
| EP | 0245930 | 11/1987 |

(Continued)

OTHER PUBLICATIONS

"Acrylic acid"; Wikipedia; <https://en.wikipedia.org/wiki/Acrylic_acid>; accessed Jul. 1, 2025. (Year: 2025).*

(Continued)

*Primary Examiner* — Andrew Sue-Ako

(74) *Attorney, Agent, or Firm* — Fish & Richardson P.C.

(57) ABSTRACT

The present disclosure relates to cementing fluids including a latex and a cement. In an exemplary embodiments, the latex includes a first polymer and a second polymer; the first polymer includes at least about 80 mol % polyvinyl acetate; the second polymer has a general structure in which x is an overall molar ratio of styrene, y is an overall molar ratio of butadiene, and z is an overall molar ratio of carboxylic acid; a sum of x, y, and z is represented as s; styrene (x) is about 20% to about 30% of s; butadiene (y) is about 70% to about 80% of s; and carboxylic acid (z) is 0% to about 2% of s.

21 Claims, 5 Drawing Sheets

(56) References Cited

U.S. PATENT DOCUMENTS

| | | | |
|---|---|---|---|
| 3,902,911 | A | 9/1975 | Messenger |
| 4,252,193 | A | 2/1981 | Powers et al. |
| 4,493,771 | A | 1/1985 | Wilson et al. |
| 4,515,708 | A | 5/1985 | Haslegrave et al. |
| 4,547,298 | A | 10/1985 | Novak |
| 4,717,488 | A | 1/1988 | Seheult et al. |
| 5,057,467 | A | 10/1991 | Croft |
| 5,135,577 | A * | 8/1992 | Brothers ................ C04B 28/04 106/724 |
| 5,558,171 | A | 9/1996 | McGlothlin et al. |
| 5,593,953 | A | 1/1997 | Malchow, Jr. |
| 5,641,385 | A | 6/1997 | Croft et al. |
| 5,911,282 | A | 6/1999 | Onan et al. |
| 6,153,049 | A | 11/2000 | Croft |
| 6,312,560 | B1 | 11/2001 | Croft |
| 6,448,206 | B1 | 9/2002 | Griffith et al. |
| 6,562,122 | B2 | 5/2003 | Dao et al. |
| 6,703,351 | B2 | 3/2004 | Stowe, II et al. |
| 6,823,940 | B2 | 11/2004 | Reddy et al. |
| 6,832,652 | B1 | 12/2004 | Dillenbeck et al. |
| 6,866,797 | B1 | 3/2005 | Martin et al. |
| 7,287,593 | B2 | 10/2007 | Hutchins et al. |
| 7,776,798 | B2 | 8/2010 | Subramanian et al. |
| 7,794,537 | B2 | 9/2010 | Barlet-Gouedard et al. |
| 7,846,250 | B2 | 12/2010 | Barlet-Gouedard et al. |
| 7,863,228 | B2 | 1/2011 | Loper et al. |
| 7,939,470 | B1 | 5/2011 | Wagle et al. |
| 8,020,618 | B2 | 9/2011 | Veronique et al. |
| 8,157,009 | B2 | 4/2012 | Patil et al. |
| 8,936,111 | B2 | 1/2015 | Maghrabi et al. |
| 8,950,492 | B2 | 2/2015 | Maghrabi et al. |
| 9,127,192 | B2 | 9/2015 | Maghrabi et al. |
| 9,222,010 | B2 | 12/2015 | Porcherie et al. |
| 9,296,937 | B2 | 3/2016 | Wagle et al. |
| 9,296,941 | B2 | 3/2016 | Wagle et al. |
| 9,321,687 | B2 | 4/2016 | Gupta et al. |
| 9,346,995 | B2 | 5/2016 | Wagle et al. |
| 9,394,202 | B2 | 7/2016 | Porcherie et al. |
| 9,410,066 | B2 | 8/2016 | Ghassemzadeh |
| 9,434,911 | B2 | 9/2016 | Bennett et al. |
| 9,469,803 | B2 | 10/2016 | Wagle et al. |
| 9,518,206 | B2 | 12/2016 | Maghrabi et al. |
| 9,550,933 | B2 | 1/2017 | Chatterji et al. |
| 9,650,559 | B2 | 5/2017 | Nelson |
| 9,701,885 | B2 | 7/2017 | Husein et al. |
| 9,796,907 | B2 | 10/2017 | Wagle et al. |
| 9,828,293 | B2 | 11/2017 | Yadav et al. |
| 9,884,985 | B2 | 2/2018 | Al-Subhi et al. |
| 9,890,082 | B2 | 2/2018 | Dubey |
| 9,896,610 | B2 | 2/2018 | Young et al. |
| 9,951,261 | B2 | 4/2018 | Nelson |
| 9,988,569 | B2 | 6/2018 | Wagle et al. |
| 10,005,930 | B2 | 6/2018 | Reddy |
| 10,017,418 | B2 | 7/2018 | Thomas et al. |
| 10,030,189 | B2 | 7/2018 | Wagle et al. |
| 10,081,755 | B2 | 9/2018 | Ballard |
| 10,112,869 | B2 | 10/2018 | Agapiou |
| 10,113,389 | B2 | 10/2018 | Pandey et al. |
| 10,138,405 | B2 | 11/2018 | Kulkarni et al. |
| 10,144,858 | B2 | 12/2018 | Kennedy et al. |
| 10,214,675 | B2 | 2/2019 | Wagle et al. |
| 10,280,122 | B2 | 5/2019 | Salla et al. |
| 10,351,754 | B1 * | 7/2019 | Reddy .................... C04B 28/02 |
| 10,457,847 | B2 | 10/2019 | Wagle et al. |
| 10,480,278 | B1 | 11/2019 | Sodhi et al. |
| 10,556,829 | B1 | 2/2020 | Reddy et al. |
| 10,570,326 | B2 | 2/2020 | Wagle et al. |
| 10,590,326 | B1 | 3/2020 | Reddy |
| 10,920,121 | B1 | 2/2021 | Alanqari et al. |
| 11,066,899 | B1 | 7/2021 | Alanqari |
| 11,286,412 | B2 | 3/2022 | Amanullah et al. |
| 11,472,741 | B2 | 10/2022 | Sampson |
| 11,492,536 | B2 | 11/2022 | Alkhalaf et al. |
| 11,713,410 | B1 * | 8/2023 | Al-Yami .................. C09K 8/46 166/293 |
| 2003/0162668 | A1 | 8/2003 | Kirsner et al. |
| 2003/0230431 | A1 | 12/2003 | Reddy et al. |
| 2006/0041060 | A1 | 2/2006 | George |
| 2006/0107874 | A1 * | 5/2006 | Castaing ............... C04B 14/043 106/638 |
| 2007/0125272 | A1 | 6/2007 | Johnson |
| 2007/0289744 | A1 * | 12/2007 | Bingamon ............ C09K 8/428 106/716 |
| 2009/0200029 | A1 | 8/2009 | Roddy et al. |
| 2010/0193126 | A1 * | 8/2010 | Saasen .................... C04B 28/02 156/325 |
| 2011/0272142 | A1 | 11/2011 | Lewis et al. |
| 2014/0116708 | A1 | 5/2014 | Wadekar et al. |
| 2014/0349895 | A1 | 11/2014 | Wagle et al. |
| 2015/0024975 | A1 | 1/2015 | Wagle et al. |
| 2016/0208158 | A1 | 7/2016 | Monahan et al. |
| 2017/0002257 | A1 | 1/2017 | Pisklak |
| 2018/0223169 | A1 | 8/2018 | AlBahrani et al. |
| 2019/0078013 | A1 | 3/2019 | Wagle et al. |
| 2020/0071593 | A1 | 3/2020 | Al-Yami et al. |
| 2020/0071596 | A1 | 3/2020 | Al-Yami et al. |
| 2020/0071598 | A1 | 3/2020 | Al-Yami et al. |
| 2020/0131425 | A1 | 4/2020 | Alsaihati |
| 2022/0259486 | A1 | 8/2022 | Alkhalaf et al. |
| 2022/0363971 | A1 | 11/2022 | Alkhalaf et al. |
| 2024/0052233 | A1 | 2/2024 | Wagle et al. |
| 2024/0067858 | A1 | 2/2024 | Al-Yami et al. |

FOREIGN PATENT DOCUMENTS

| | | |
|---|---|---|
| GB | 2131067 | 6/1984 |
| WO | WO 2014123709 | 8/2014 |
| WO | WO 2014200671 | 12/2014 |
| WO | WO 2015031270 | 3/2015 |
| WO | WO 2016043979 | 3/2016 |
| WO | WO 2019112970 | 6/2019 |
| WO | WO 2021188154 | 9/2021 |

OTHER PUBLICATIONS

U.S. Appl. No. 18/480,888, filed Oct. 4, 2023, AlYami et al.

[No Author Listed], "Standard Test Method for Epoxy Content of Epoxy Resins," ASTM-D1652-11, 2019, 2 pages.

[No Author Listed], "Standard Specification for Coal Fly Ash and Raw or Calcined Natural Pozzolan for Use in Concrete—ASTM C618-22," Feb. 2003, Annual Book of ASTM Standards, vol. 4, 2nd Edition, 3 pages.

Al-Yami et al., "An Overview of Different Chemicals Used in Designing Cement Slurries for Oil and Gas Wells," Prepared for presentation at the SPE Kuwait Oil & Gas Show and Conference held in Mishref, Kuwait, Oct. 11-14, 2015, 16 pages.

Al-Yami et al., "Consideration to Batch Mixing Time Improves API Recommendation for Testing Cement Slurries and Prevents Cement Failures: Lab Testing and Field Application," Prepared for presentation at the SPE Kingdom of Saudi Arabia Annual Technical Symposium and Exhibition held in Dammam, Saudi Arabia, Apr. 24-27, 2017, 11 pages.

Al-Yami et al., "Development of New Retarder Systems To Mitigate Differential Cement Setting in Long Deep Liners," Prepared for presentation at the SPE/IADC Middle East Drilling Technology Conference & Exhibition held in Cairo, Egypt, Oct. 22-24, 2007, 15 pages.

Al-Yami et al., "Formation Damage Induced by Various Water-Based Fluids Used To Drill HP/HT Wells," Prepared for presentation at the 2008 SPE International Symposium and Exhibition on Formation Damage Control held in Lafayette, Louisiana, U.S.A., Feb. 13-15, 2008, 30 pages.

Al-Yami et al., "Optimum practices to mitigate gas migration problems in deep gas wells," SPE Russian Petroleum Technology Conference, Oct. 2017, 21 pages.

An et al., "A strong inhibition of polyethyleneimine as shale inhibitor in drilling fluid," Journal of Petroleum Science and Engineering, Feb. 2018, 161:1-8, 8 pages.

Baueregger, "Interaction of latex polymers with cement-based building materials," Thesis for the degree of Doctor of Science, Technical University of Munich, Oct. 2014, 278 pages.

(56) References Cited

OTHER PUBLICATIONS

Bensted, "Retardation of Cement Slurries to 250° F.," Offshore Europe Conference, Sep. 1991, 8 pages.
Brothers et al., "Synthetic Retarder for High-Strength Cement," Prepared for presentation at the 1991 SPE/IADC Drilling Conference held in Amsterdam, Mar. 11-14, 1991, 7 pages.
Brown et al., "The Use of Lightweight Cement Slurries and Downhole Chokes Improves the Success of Primary Cementing on Gas-Drilled Wells," SPE Annual Technical Conference and Exhibition, Oct. 2003, 11 pages.
Carico et al., "Description and Use of Polymers Used in Drilling, Workovers, and Completions," Presented at the 1978 Society of Petroleum Engineers of AIME Production Technology Symposium held in Hobbs, New Mexico, Oct. 30-31, 1978, 10 pages.
Chandra et al., "Interactions of Polymers and Organic Admixtures on Portland Cement Hydration," Cement and Concrete Research, Nov. 1987, 17(6):875-890, 16 pages.
Chevalier et al., "Film formation with latex particles," Colloid and Polymer Science, Aug. 1992, 270(8):806-821, 17 pages.
Dean et al., "A Unique Gas Flow Model Reveals Insight to Predict Gas Migration in Cement," SPE Western Regional Meeting, Mar. 1992, 12 pages.
Dupriest et al., "Design Methodology and Operational Practices Eliminate Differential Sticking," SPE/IADC Drilling Conference, Feb. 2010, 9 pages.
Erkselius et al., "Drying rate variations of latex dispersions due to salt induced skin formation," Journal of Colloid and Interface Science, Jan. 2008, 317(1):83-95, 13 pages.
Fornasier et al., "Designing Environmentally Conforming Drilling Fluids: Challenges and Considerations in Latin America," SPE Latin America and Caribbean Petroleum Engineering Conference, May 2017, 8 pages.
Glossary.slb.com [online], "pounds per barrel," upon information and belief, available no later than Dec. 2023, retrieved on Dec. 13, 2023, URL <https://glossary.slb.com/en/terms/p/pounds_per_barrel>, 2 pages.
Guancheng et al., "Polyethyleneimine as shale inhibitor in drilling fluid," Applied Clay Science, Jul. 2016, 127-128:70-77, 8 pages.
Harms et al., "Cementing of Fragile-Formation Wells with Foamed Cement Slurries," Journal of Petroleum Technology, Jun. 1985, 37(06):1049-1057, 9 pages.
Hestad et al., "Drilling Fluids Automix," Prepared for presentation at the SPE/IADC Middle East Drilling Technology Conference and Exhibition held in Abu Dhabi, UAE, Jan. 29-31, 2018, 7 pages.
Hou et al., "Research of High Temperature Tolerance Latex Slurry System," Twentieth International Offshore and Polar Engineering Conference, Jun. 2010, 1 page.
Jenni et al., "Changes in microstructures and physical properties of polymer-modified mortars during wet storage," Cement and Concrete Research, Jan. 2006, 36(1):79-90, 12 pages.
Jenni et al., "Influence of polymers on microstructure and adhesive strength of cementitious tile adhesive mortars," Cement and Concrete Research, Jan. 2005, 35(1):35-50, 16 pages.
Jennings et al., "Gas Migration After Cementing Greatly Reduced," Prepared for presentation at the SPE 13th Middle East Oil Show & Conference to be held in Bahrain, Apr. 5-8, 2003, 14 pages.
Jolicoeur et al., "Chemical Admixture-Cement Interactions: Phenomenology and Physico-chemical Concepts," Cement and Concrete Composites, 1998, 20(2-3):87-101, 15 pages.
Kardon, "Polymer-Modified Concrete: Review," Journal of Materials in Civil Engineering, May 1997, 9(2):85-92, 8 pages.
Keddie, "Film formation of latex," Materials Science and Engineering: R: Reports, Dec. 1997, 21(3):101-170, 70 pages.
Kesalkar et al., "Effect of Poly Vinyl Acetate and Poly Vinyl Alcohol as Cement Admixture on Strength of Concrete," International Journal for Research in Applied Science & Engineering Technology, Jul. 2017, 5(VIII):41-47, 8 pages.
Kulakofsky et al., "New Technology for the Delivery of Beaded Lightweight Cements," 2005 SPE Annual Technical Conference and Exhibition, Oct. 2005, 6 pages.
Kulkarni et al., "A Novel Lightweight Cement Slurry and Placement Technique for Covering Weak Shale in Appalachian Basin," 1999 SPE Eastern Regional Meeting, Oct. 1999, 8 pages.
Kumar et al., "Evaluation of Flexural Strength of Epoxy Polymer Concrete with Red Mud and Fly Ash," International Journal of Current Engineering and Technology, Dec. 2013, 3(5):1799-1803, 5 pages.
Kupwade-Patil et al. "Hydration kinetics and morphology of cement pastes with pozzolanic volcanic ash studied via synchrotron-based techniques," Journal of Material Science, Kluwer Academic Publishers, Dordrecht, 2018, 53(3):1743-1757, 15 pages.
Leroy et al., "Valorization of Pozzolans as Partial Additive of Portland Cement: A Case of Pozzolans from the Localities of Foumbot, Penja and Tombel (Cameroon)," Journal of Minerals and Materials Characterization and Engineering, Jan. 2019, 16 pages.
Li et al., "Styrene butadiene resin/nano-SiO2 composite as a water-and-oil-dispersible plugging agent for oil-based drilling fluid," Colloids and Surfaces A: Physicochemical and Engineering Aspects, Dec. 2020, 606: 125245, 11 pages.
Lothenbach et al., "A Thermodynamic Approach to The Hydration of Sulphate-resisting Portland Cement," Waste Management, 2006, 26(7):706-719, 14 pages.
Lothenbach et al., "Effect of Temperature on The Pore Solution, microstructure and Hydration Products of Portland Cement Pastes," Cement and Concrete Research, Apr. 2007, 37(4):483-491, 9 pages.
Maherzi et al., "Study of the polymer mortar based on dredged sediments and epoxy resin: Effect of the sediments on the behavior of the polymer mortar," Powder Technology, 2020, 361:968-982, 15 pages.
Martins et al., "Tools for predicting and avoiding gas migration after casing cementing in Brazilian fields," Fifth Latin American and Caribbean Petroleum Conference and Exhibition, Aug.-Sep. 1997, 8 pages.
Maxey, "Rheological Analysis of Static and Dynamic Sag in Drilling Fluids," Annual Transactions Of The Nordic Rheology Society, 15:181, 2007, 8 pages.
McCaskill et al., "Drilling Fluid System for Deep Drilling-An Interrelated Approach," 1972 Deep Drilling Symposium of the Society of Petroleum Engineers of AIME, Sep. 1972, 8 pages.
Mukhalalaty et al., "Increasing Well Life Cycle by Eliminating the Multistage Cementer and Utilizing a Light Weight High Performance Slurry," 1999 SPE Middle East Oil Show, Feb. 1999, 12 pages.
Navarrete et al., "Applications of Xanthan Gum in Fluid-Loss Control and Related Formation Damage," Prepared for presentation at the 2000 SPE Permian Basin Oil and Gas Recovery Conference held in Midland, Texas, Mar. 21-23, 2000, 21 pages.
Ohama, "Polymer-Based Admixtures," Cement and Concrete Composites, 1998, 20(2-3):189-212, 24 pages.
Outmans, "Mechanics of Differential Pressure Sticking of Drill Collars," Annual Fall Meeting of Southern California Petroleum Section, Oct. 1957, 218, 10 pages.
Plank et al., "Study on the interaction between anionic and cationic latex particles and Portland cement," Colloids and Surfaces A: Physicochemical and Engineering Aspects, Dec. 2008, 330(2-3):227-233, 7 pages.
Red Mud Production, Composition and Impact, Richard (ed.), 2018, 327 pages.
Root et al., "Foamed Cement: A New Technique to Solve Old Problems," 1982 Rocky Mountain Regional Meeting, May 1982, 8 pages.
Routh et al., "A process model for latex film formation: limiting regimes for individual driving forces," Langmuir, Aug. 1999, 15(22):7762-7773, 12 pages.
Smith et al., "A New Ultra-Lightweight Cement with Super Strength," Journal of Petroleum Technology, Aug. 1980, 32(08):1438-1444, 7 pages.
Sultan, "Study the Influence of Poly Vinyl Acetate on Flow Behavior of Bentonite Dispersions in Water," Engineering and Technology Journal, 2009, 27(4):799-808, 10 pages.

(56) References Cited

OTHER PUBLICATIONS

Sykes et al., "New Technology in Gas Migration Control," Prepared for presentation at the 62nd Annual Technical Conference and Exhibition of the Society of Petroleum Engineers held in Dallas, TX, Sep. 27-30, 1987, 6 pages.
Talabani et al., "Gas Migration Eliminated Through Correct Cement Design Including Elastomers," Presented at the 1997 SPE/IADC Middle East Drilling Technology Conference held in Manama, Bahrain, Nov. 23-25, 1997, 6 pages.
Talabani, "Can cement log be better managed and analyzed," 11th Abu Dhabi International Petroleum Exhibition and Conference, Oct. 2004, 10 pages.
Tanner et al., "Unique Ultra Light-Weight Cement Slurry Compositions for Use in Unique Well Conditions, Laboratory Evaluation, and Field Performance," Middle East Oil Technical Conference, Mar. 1983, 10 pages.
Voxkanyan, "Glue Compositions Based on Polyvinyl Acetate and Its Derivatives," Polymer Science. Series D, May 2009, 2(2):92-96, 5 pages.
Wang et al., "Influence of polymer on cement hydration in SBR-modified cement pastes," Cement and Concrete Research, Sep. 2006, 36(9):1744-1751, 8 pages.
Wang et al., "Mechanism analysis and effect of styrene-acrylate copolymer powder on cement hydrates," Construction and Building Materials, Apr. 2013, 41:538-544, 7 pages.
International Search Report and Written Opinion in International Appln. No. PCT/US2025/022511, mailed on Sep. 1, 2025, 13 pages.

* cited by examiner

POLYMER-BASED LATEX FOR CEMENTING FLUIDS

TECHNICAL FIELD

This disclosure relates to cementing fluids including a polymer-based latex and a cement.

BACKGROUND

Natural resources such as gas, oil, and water in a subterranean formation can be produced by drilling a wellbore into the subterranean formation while circulating a drilling fluid in the wellbore. A well is cemented prior to hydrocarbon production. Well cementing includes introducing cement to provide a hydraulic seal that establishes zone isolation, prevents fluid communication between producing zones in the borehole, and blocks the escape of fluids to the surface. Well cementing also anchors and supports tubulars installed in the wellbore and protects the tubulars against corrosion by formation fluids.

SUMMARY

The present disclosure provides a cementing fluid including a latex including a first polymer and a second polymer dispersed in water, and a cement. The first polymer includes at least about 80 mol % polyvinyl acetate. The second polymer is derived from styrene and butadiene, and has the general structure:

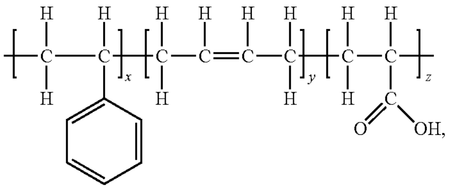

where a sum of x, y, and z is equal to s, x is about 20% to about 30% of s, y is about 70% to about 80% of s, and z is 0% to about 2% of s. A concentration of the cement in the cementing fluid composition is about 50 wt % to about 80 wt %, and a concentration of the latex in the cementing fluid composition is about 1 wt % to about 15 wt %.

The present disclosure also provides a method including providing a first polymer and a second polymer, and mixing the first polymer and the second polymer with a cement to form a cementing fluid. The first polymer includes at least about 80 mol % polyvinyl acetate. The second polymer has the general structure:

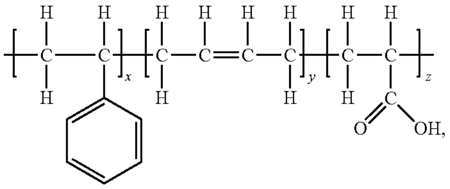

where a sum of x, y, and z is equal to s, x is about 20% to about 30% of s, y is about 70% to about 80% of s, and z is 0% to about 2% of s.

DETAILED DESCRIPTION

The present disclosure relates to polymer-based latexes for use in cementing fluids. The polymer-based latex includes a stable, aqueous colloidal dispersion of polymer particles. In some embodiments, the polymer particles have an average particle diameter of about 10 nanometers (nm) to about 1,000 nm. The polymer-based latex can include additional components, such as monomers, oligomers, surfactants, viscosifiers, weighting agents, and other additives.

The subject matter described in this disclosure can be implemented in particular embodiments, so as to realize one or more of the following advantages. The polymer-based latexes of the present disclosure can be included in cementing fluids to reduce and/or eliminate the potential of fluid channeling. The polymer-based latexes of the present disclosure can be included in cementing fluids to form thin-film barriers which can reduce and/or eliminate the potential of formation of micro-annuli. The polymer-based latexes of the present disclosure can be included in cementing fluids to form the thin-film barriers to reduce and/or eliminate filtration losses. The polymer-based latexes of the present disclosure can be included in cementing fluids to improve viscosity of the cementing fluids. The polymer-based latexes of the present disclosure can be included in cementing fluids to improve subsequent well performance and production. The polymer-based latexes of the present disclosure can reduce and/or eliminate fluid losses, which can minimize gas migration, improve wellbore integrity, and aid in the mixing ability of cement slurries.

Figure 1:
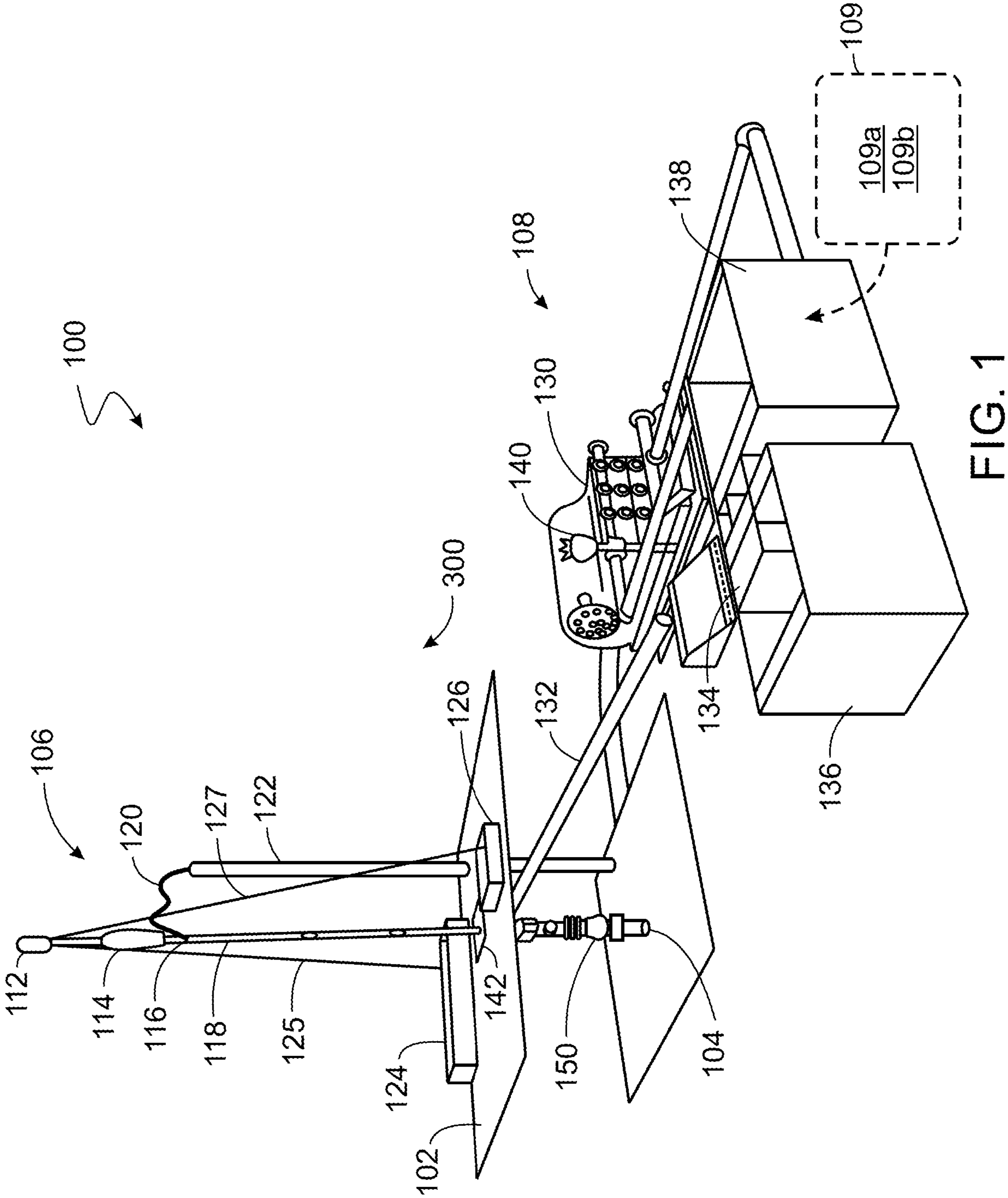
FIG. 1 is a schematic diagram of an example wellbore being drilled in a subterranean formation.

FIG. 1 is a partial schematic perspective view of an example rig system 100 for drilling and producing a well. The well can extend from the surface through the Earth to one or more subterranean zones of interest. The example rig system 100 includes a drill floor 102 positioned above the surface, a wellhead 104, a drill string assembly 106 supported by the rig structure, and a fluid circulation system 108 to filter used drilling fluid from the wellbore and provide clean drilling fluid to the drill string assembly 106. For example, the example rig system 100 of FIG. 1 is shown as a drill rig capable of performing a drilling operation with the rig system 100 supporting the drill string assembly 106 over a wellbore. The wellhead 104 can be used to support casing or other well components or equipment into the wellbore of the well. The example wellhead assembly 104 can take a variety of forms and include a number of different components. For example, the wellhead assembly 104 can include additional or different components than the example shown in FIG. 1. Similarly, the circulation system 108 can include additional or different components than the example shown in FIG. 1.

The derrick or mast is a support framework mounted on the drill floor 102 and positioned over the wellbore to support the components of the drill string assembly 106 during drilling operations. A crown block 112 forms a longitudinally fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, and the kelly 118 turns with the drill string assembly 106 as the rotary table 142 of the drill string assembly turns.

In the example rig system 100 of FIG. 1, the drill string assembly 106 is made up of drill pipes with a drill bit (not shown) at a longitudinally bottom end of the drill string. The drill pipe can include hollow steel piping, and the drill bit can include cutting tools, such as blades, dics, rollers, cutters, or a combination of these, to cut into the formation and form the wellbore. The drill bit rotates and penetrates through rock formations below the surface under the combined effect of axial load and rotation of the drill string assembly 106. In some embodiments, the kelly 118 and swivel 116 can be replaced by a top drive that allows the drill string assembly 106 to spin and drill. The wellhead assembly 104 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The wellhead assembly 104 also includes a blowout preventer 150 positioned at the surface 101 of the well and below (but often connected to) the drill floor 102. The blowout preventer 150 acts to prevent well blowouts caused by formation fluid entering the wellbore, displacing drilling fluid, and flowing to the surface at a pressure greater than atmospheric pressure. The blowout preventer 150 can close around (and in some instances, through) the drill string assembly 106 and seal off the space between the drill string and the wellbore wall. The blowout preventer 150 is a valve (or assembly of valves) at the top of the well that can be closed to seal the well to prevent a blowout, which is an uncontrolled release of formation fluid from the well.

During a drilling operation of the well, the circulation system 108 circulates drilling fluid from the wellbore to the drill string assembly 106, filters used drilling fluid from the wellbore, and provides clean drilling fluid to the drill string assembly 106. The example circulation system 108 includes a fluid pump 130 that fluidly connects to and provides drilling fluid to drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling fluid from the surface, through the drill string assembly 106, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluid to go into the formation. Apart from well control, drilling fluid can also cool the drill bit and lift rock cuttings from the drilled formation up the annulus and to the surface to be filtered out and treated before it is pumped down the drill string assembly 106 again. The drilling fluid returns in the annulus with rock cuttings and flows out to the flow-out line 132, which connects to and provides the fluid to the shale shaker 134. The flow line is an inclined pipe that directs the drilling fluid from the annulus to the shale shaker 134. The shale shaker 134 includes a mesh-like surface to separate the coarse rock cuttings from the drilling fluid, and finer rock cuttings and drilling fluid then go through the settling pit 136 to the suction pit 136. The circulation system 108 includes a mud hopper 140 into which materials (for example, to provide dispersion, rapid hydration, and uniform mixing) can be introduced to the circulation system 108. The fluid pump 130 cycles the drilling fluid up the standpipe 122 through the swivel 116 and back into the drill string assembly 106 to go back into the well.

Once the well has been drilled and tubulars are installed within the well, the rig system 100 can be used to cement the well. The circulation system 108 or another similar system can be used to flow a cementing fluid 109 into the well. The circulation system 108 or another similar system can be used to flow a displacement fluid into the well, which displaces the cementing fluid 109 to at least partially fill an annulus defined between the tubulars and the wellbore. The cementing fluid 109 is allowed to set (harden) to complete the well cementing process.

The cementing fluid 109 includes cement. The cement can include calcium oxide, silicon dioxide, aluminum oxide, iron oxide, and gypsum. In some embodiments, a concentration of the cement in the cementing fluid 109 is about 50 wt % to about 80 wt %, for example, about 50 wt % to about 75 wt %, about 50 wt % to about 70 wt %, about 55 wt % to about 80 wt %, about 55 wt % to about 75 wt %, about 55 wt % to about 70 wt %, about 60 wt % to about 80 wt %, about 60 wt % to about 75 wt %, about 60 wt % to about 70 wt %, about 55 wt %, about 60 wt %, about 65 wt %, about 70 wt %, or about 75 wt %. Table 1 provides a general composition of an example cement.

TABLE 1

Generalized composition of example cement.

| Compound | Molar Concentration |
|---|---|
| $SiO_2$ | 23.2% |
| $Al_2O_3$ | 3.7% |
| $Fe_2O_3$ | 4.8% |
| CaO | 63.8% |
| MgO | 1.3% |
| $SO_3$ | 2.2% |

TABLE 1-continued

| Generalized composition of example cement. | |
|---|---|
| Compound | Molar Concentration |
| Alkalis | 0.47% |
| Lime | 0.74% |

The cement can include, for example, tricalcium silicate, dicalcium silicate, tricalcium aluminate, calcium alumino-ferrite, gypsum, magnesia, calcium oxide, and calcium hydroxide.

The cementing fluid 109 includes a latex, which includes a polymer dispersed in water. The cementing fluid 109 can be based on emulsion polymerization. In some embodiments, the cementing fluid 109 includes a first polymer 109*a* dispersed in water. The first polymer 109*a* includes polyvinyl acetate. In some embodiments, a molar concentration of polyvinyl alcohol in the first polymer is less than about 5 mol %, less than about 2.5 mol %, less than about 2 mol %, less than about 1 mol %, less than about 0.5 mol %, less than about 0.25 mol %, or less than about 0.1 mol %. In some embodiments, the first polymer 109*a* is substantially free from polyvinyl alcohol.

In some embodiments, the cementing fluid 109 includes a second polymer 109*b* dispersed in water. The second polymer 109*b* is derived from styrene and butadiene. In some embodiments, the second polymer 109*b* has the following general structure:

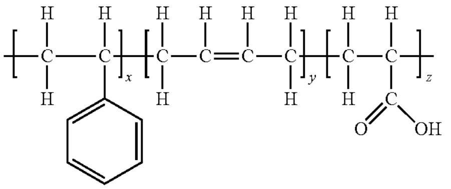

where x is an overall molar ratio of styrene in the second polymer 109*b*, y is an overall molar ratio of butadiene in the second polymer 109*b*, and z is an overall molar ratio of carboxylic acid in the second polymer 109*b*. A sum of x, y, and z can be represented as s. In some embodiments, x (styrene) is about 20% to about 30% of s. In some embodiments, y (butadiene) is about 70% to about 80% of s. In some embodiments, z (carboxylic acid) is 0% to about 2% of s, for example, 0% to about 1% of s, 0% to about 0.5% of s, 0% to 0.25% of s, 0% to about 0.1% of s, or 0% of s. In some embodiments, a ratio of x (styrene) to y (butadiene) is about 0.22:1 to about 1:0.22.

In some embodiments, the cementing fluid 109 includes both the first polymer 109*a* and the second polymer 109*b*. In some embodiments, a molar ratio of the first polymer 109*a* to the second polymer 109*b* in the cementing fluid 109 is less than about 1. For example, in some embodiments, the molar ratio of the first polymer 109*a* to the second polymer 109*b* in the cementing fluid 109 is about 1:1.5 to about 1:5, about 1:1.5 to about 1:4, about 1:1.5: to about 1:3.5, about 1:2 to about 1:5, about 1:2 to about 1:4, about 1:2 to about 1:3.5, about 1:2.5 to about 1:5, about 1:2.5 to about 1:4, about 1:2.5 to about 1:3.5, about 1:2, about 1:2.5, about 1:3, about 1:3.5, or about 1:4.

In some embodiments, a combined concentration of the first polymer 109*a* and the second polymer 109*b* in the cementing fluid 109 is about 1 wt % to about 15 wt %, for example, about 1 wt % to about 12 wt %, about 1 wt % to about 10 wt %, about 2 wt % to about 15 wt %, about 2 wt % to about 12 wt %, about 2 wt % to about 10 wt %, about 4 wt % to about 15 wt %, about 4 wt % to about 12 wt %, about 4 wt % to about 10 wt %, about 4 wt %, about 6 wt %, about 8 wt %, about 10 wt %, or about 12 wt %.

The cementing fluid 109 can further include additives. Non-limiting examples of additives include starch, cellulosic polymer, dispersant, set retarder, silica (for example, silica sand or silica flour), a fluid loss additive, an expanding additive, or any combination thereof. In some embodiments, the cementing fluid 109 includes a fluid loss additive, a set retarder, or both.

In some embodiments, during cement hydration, the hydrophilic portion(s) of the first polymer 109*a*, the second polymer 109*b*, or both are attracted to the water while the hydrophobic portion(s) are directed to the air phase or to pores and capillaries not filled with water. As the water content is reduced, the hydrophobic portion(s) can coalesce together and form a film barrier. In some embodiments, the first polymer 109*a*, the second polymer 109*b*, or both interact with cement hydration products to form a semi-permeable membrane.

Anhydrous cement compounds have a large number of oxygen ions. Hydrogen bonding between groups of the organic compounds can generate layers that can be adsorbed (by hydrogen bonding with the oxygen ions) onto the crystals of the anhydrous cement. At large potentials of hydrogen (pH), organic compounds (such as organic acid) are present in carboxylate form during cement hydration. Because cement crystals generally have a positive charge due to the presence of excess partial valences from calcium ions, the organic acids can react with the positive ions resulting in ionic bonding, followed by cross-linking for setting the cement.

Figure 2:
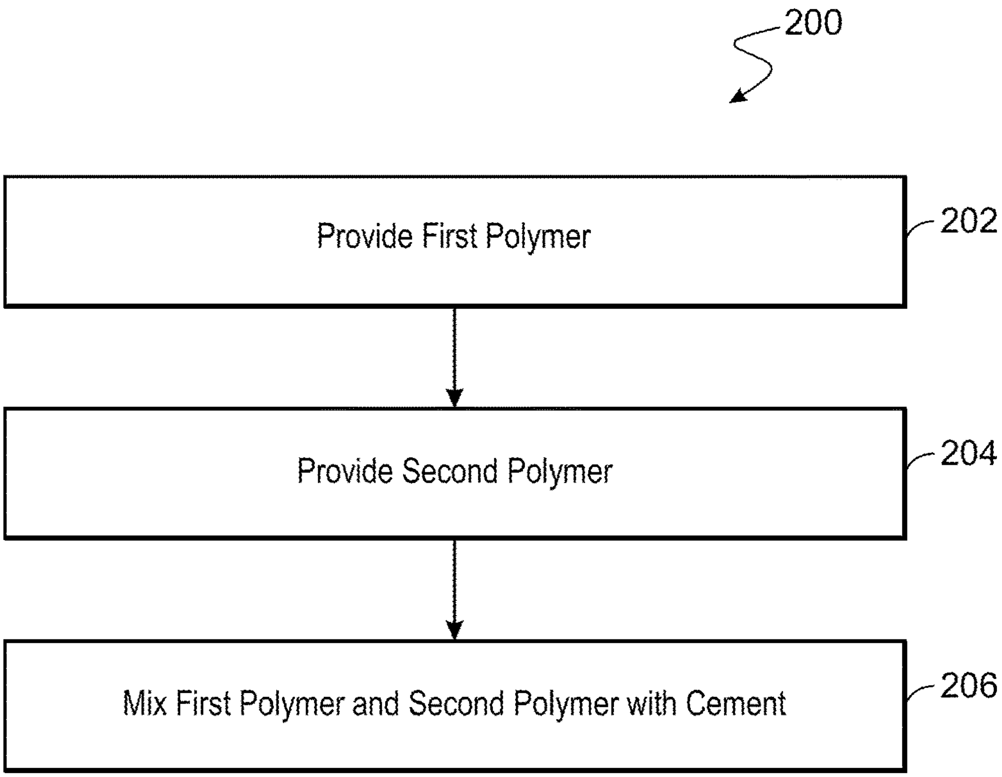
FIG. 2 is a flow chart of an example method of forming a cementing fluid that includes a polymer-based latex.

FIG. 2 is a flow chart of an example method 200 of forming a drilling fluid that includes a polymer-based latex, such as the cementing fluid 109 including the first polymer 109*a*, the second polymer 109*b*, or a mixture of both. At block 202, a first polymer (such as the first polymer 109*a*) is provided. In some embodiments, a molar concentration of polyvinyl alcohol in the first polymer 109*a* provided at block 202 is less than about 5 mol %, less than about 2.5 mol %, less than about 2 mol %, less than about 1 mol %, less than about 0.5 mol %, less than about 0.25 mol %, or less than about 0.1 mol %. In some embodiments, the first polymer 109*a* is substantially free from polyvinyl alcohol. In some embodiments, providing the first polymer 109*a* does not include hydrolysis of polyvinyl acetate into polyvinyl alcohol.

At block 204, a second polymer (such as the second polymer 109*b*) is provided. The second polymer 109*b* provided at block 204 has the following general structure:

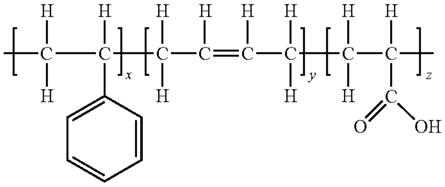

where x is an overall molar ratio of styrene in the second polymer 109*b*, y is an overall molar ratio of butadiene in the second polymer 109*b*, and z is an overall molar ratio of carboxylic acid in the second polymer 109*b*. A sum of x, y, and z can be represented as s. In some embodiments, x (styrene) is about 20% to about 30% of s. In some embodiments, y (butadiene) is about 70% to about 80% of s. In some embodiments, z (carboxylic acid) is 0% to about 2% of s, for example, 0% to about 1% of s, 0% to about 0.5% of s, 0% to 0.25% of s, 0% to about 0.1% of s, or 0% of s. In some embodiments, a ratio of x (styrene) to y (butadiene) in the second polymer 109*b* is about 0.22:1 to about 1:0.22. In some embodiments, providing the second polymer 109*b* does not include carboxylation of a styrene-butadiene polymer.

At block 206, the first polymer 109*a* (provided at block 202) and the second polymer 109*b* (provided at block 204) are mixed to form a drilling fluid (such as the cementing fluid 109). In some embodiments, the first polymer 109*a*, second polymer 109*b*, and cement are mixed to form a cementing fluid 109. In some embodiments, the cement mixed with the first polymer 109*a* and the second polymer 109*b* at block 206 to form the cementing fluid 109 includes calcium oxide, silicon dioxide, aluminum oxide, iron oxide, and gypsum.

In some embodiments, the first polymer 109*a*, second polymer 109*b*, and an additive are mixed to form a drilling fluid (such as the cementing fluid 109). In some embodiments, the additive mixed with the first polymer 109*a* and the second polymer 109*b* at block 206 to form the drilling fluid (such as the cementing fluid 109) includes starch, cellulosic polymer, dispersant, set retarder, silica, a fluid loss additive, an expanding additive, or any combination thereof.

In some embodiments, a molar ratio of the first polymer 109*a* to the second polymer 109*b* in the cementing fluid 109 formed at block 206 is less than about 1. For example, in some embodiments, the molar ratio of the first polymer 109*a* to the second polymer 109*b* in the cementing fluid 109 is about 1:1.5 to about 1:5, about 1:1.5 to about 1:4, about 1:1.5: to about 1:3.5, about 1:2 to about 1:5, about 1:2 to about 1:4, about 1:2 to about 1:3.5, about 1:2.5 to about 1:5, about 1:2.5 to about 1:4, about 1:2.5 to about 1:3.5, about 1:2, about 1:2.5, about 1:3, about 1:3.5, or about 1:4. In some embodiments, a combined concentration of the first polymer 109*a* and the second polymer 109*b* in the cementing fluid 109 formed at block 206 is about 1 wt % to about 15 wt %, for example, about 1 wt % to about 12 wt %, about 1 wt % to about 10 wt %, about 2 wt % to about 15 wt %, about 2 wt % to about 12 wt %, about 2 wt % to about 10 wt %, about 4 wt % to about 15 wt %, about 4 wt % to about 12 wt %, about 4 wt % to about 10 wt %, about 4 wt %, about 6 wt %, about 8 wt %, about 10 wt %, or about 12 wt %.

Figure 3:
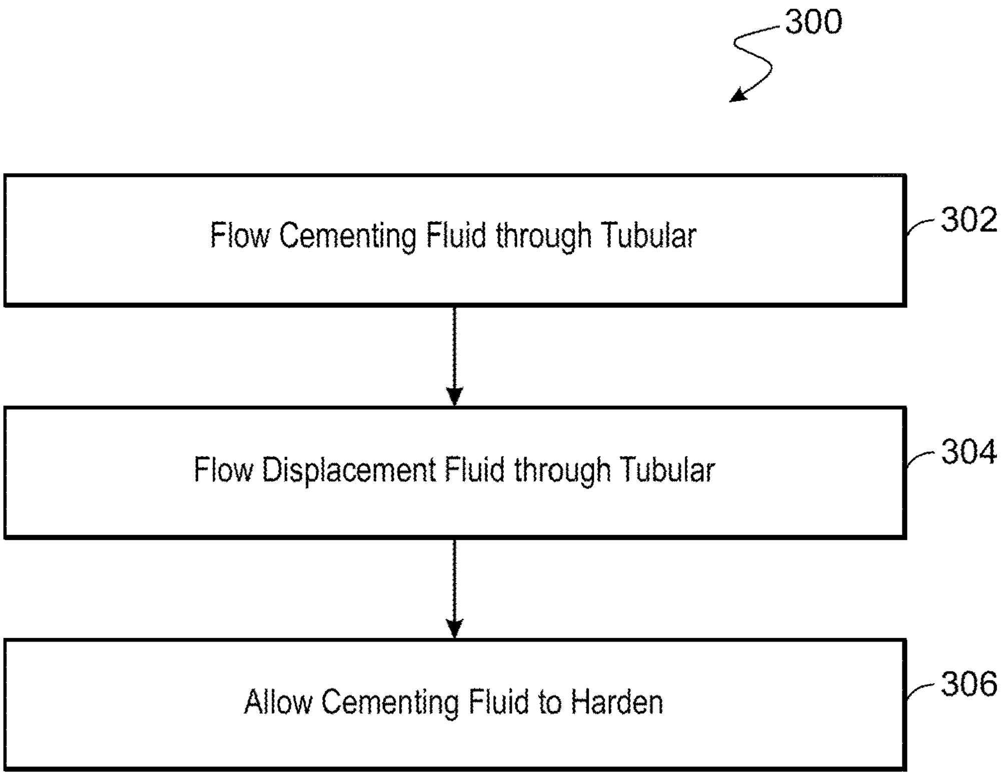
FIG. 3 is a flow chart of an example method of cementing a wellbore in a subterranean formation.

FIG. 3 is a flow chart of an example method 300 of cementing a wellbore in a subterranean formation. As an example, the rig system 100 can be used to implement the method 300. At block 302, a cementing fluid (such as the cementing fluid 109) is flowed through a tubular placed within a wellbore (for example, a casing that has been installed in the wellbore after the wellbore has been drilled). The cementing fluid 109 includes a latex. The latex can include a first polymer (such as the first polymer 109*a*), a second polymer (such as the second polymer 109*b*), or a mixture of both.

At block 304, a displacement fluid (for example, water) is flowed through the tubular, thereby displacing the cementing fluid 109 to at least partially fill an annular space defined between the tubular and the wellbore. At block 306, the cementing fluid 109 is allowed to harden in the annular space defined between the tubular and the wellbore. Allowing the cementing fluid 109 to harden in the annular space at block 306 cements the well.

While this specification contains many specific embodiment details, these should not be construed as limitations on the scope of what may be claimed, but rather as descriptions of features that may be specific to particular embodiments. Certain features that are described in this specification in the context of separate embodiments can also be implemented, in combination, in a single embodiment. Conversely, various features that are described in the context of a single embodiment can also be implemented in multiple embodiments, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described embodiments should not be understood as requiring such separation or integration in all embodiments, and it should be understood that the described components and systems can generally be integrated together or packaged into multiple products.

Accordingly, the previously described example embodiments do not define or constrain the present disclosure. Other changes, substitutions, and alterations are also possible without departing from the spirit and scope of the present disclosure.

EXAMPLES

Example 1. Slurry Preparation and Characterization

Slurries 1 and 2, having the compositions shown in Tables 2 and 3, respectively, were prepared using a standard API blender, a propeller-type mixing device. The maximum rotational speed used during slurry preparation was 12,000 rotations per minute (RPM).

TABLE 2

Slurry 1 Formulation

| Component | Quantity (g) |
|---|---|
| Water | 245 |
| Retarder | 6 |
| Latex (PVA†) | 25 |
| Latex (SBR‡) | 75 |
| Cement | 779 |

†Polyvinyl acetate
‡Styrene-butadiene rubber

TABLE 3

Slurry 2 Formulation

| Component | Quantity (g) |
|---|---|
| Water | 245 |
| Fluid Loss Additive | 3.15 |
| Retarder | 10 |
| Latex (PVA†) | 25 |
| Latex (SBR‡) | 75 |
| Cement | 779 |

†Polyvinyl acetate
‡Styrene-butadiene rubber

Slurry Rheology

The slurry was conditioned in an atmospheric consistometer before obtaining rheological readings. A Fann viscometer (Model-35), a rotational cylinder and bob instrument having two speeds of rotation (200 and 300 rpm) was used to evaluate the slurry rheology.

Thickening Time Testing

Figure 4:
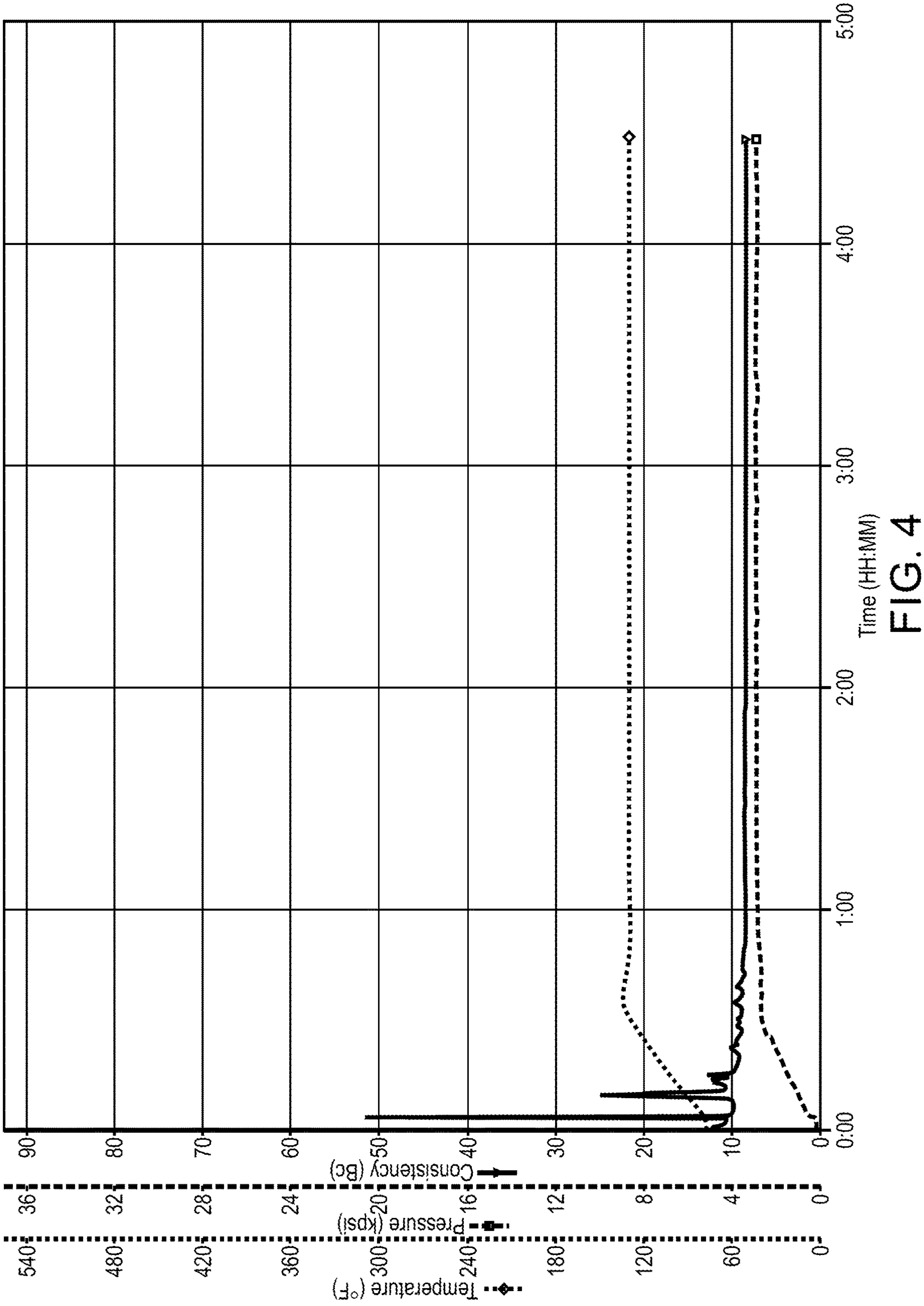
FIG. 4 is a representative plot showing a thickening time test result.

The conditioned slurry was then poured into an API standard high pressure and temperature (HP/HT) consistometer slurry cup to evaluate the thickening time. The tests determined the length of time the slurry remained in a pumpable fluid state under simulated wellbore conditions, that is, to simulate pumping under high temperature and high pressure conditions. API thickening time was measured in Bearden Consistency Units ($B_c$), on a scale of 0-100 $B_c$. A freshly prepared slurry started at less than 30 $B_c$, and 100 $B_c$ indicated the end of the test. FIG. 4 shows a typical thickening time test result—the slurry remained in liquid state, while the consistency profile was a horizontal straight line. Then, as the slurry set, the consistency increased until it reached 100 $B_c$.

Free Water Test

After the slurry was heated with a pressurized consistometer, it was cooled down and placed in a 250 ml graduated cylinder. The top part of the fluid in the cylinder was considered a free fluid, after two hours. The cylinder was placed in an angle that is similar to the well condition. At vertical condition, the slurry had less free water content than slurries tested at angle.

Results

Figure 5:
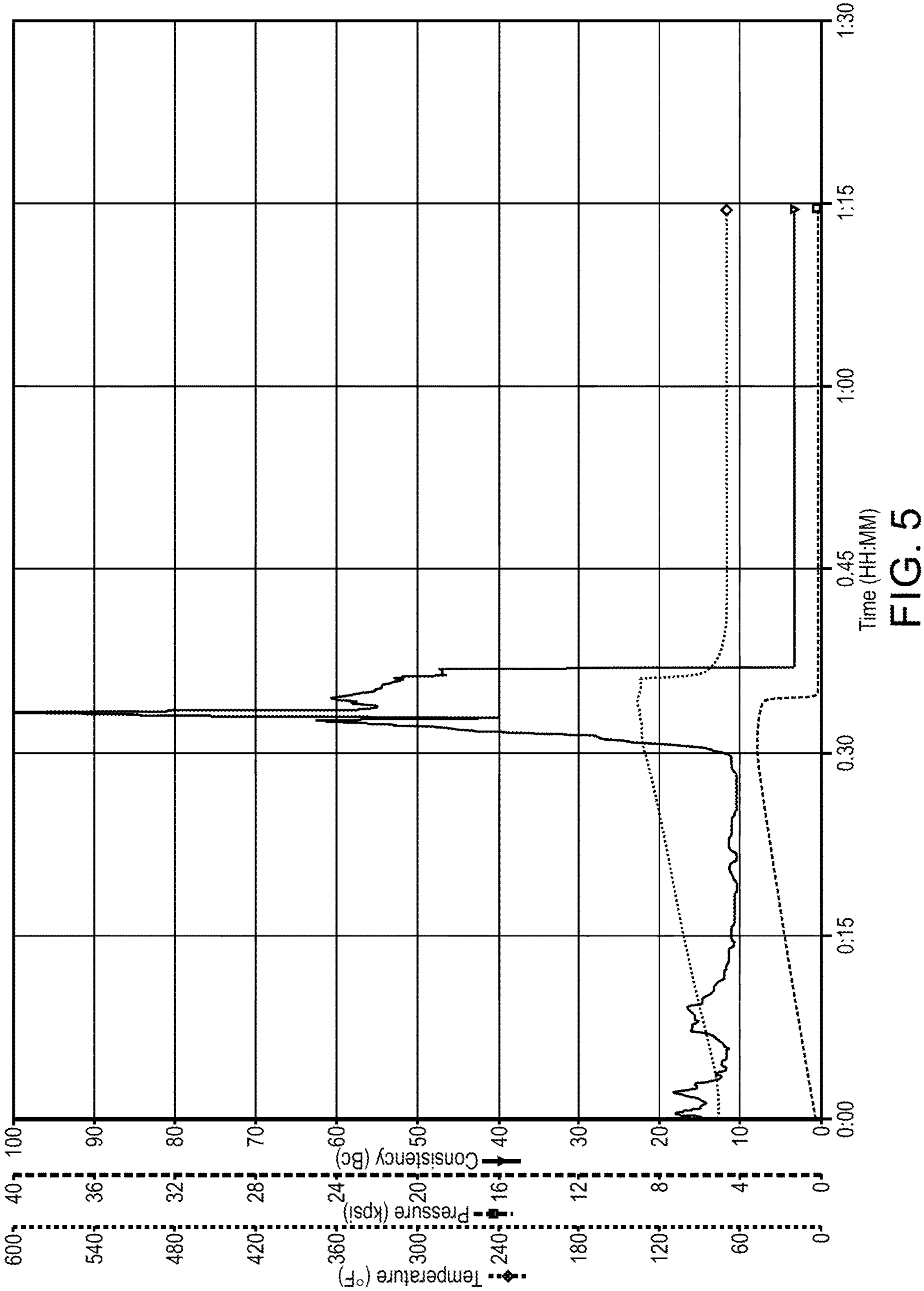
FIG. 5 is a plot showing a thickening time test result for a slurry according to certain embodiments of the present disclosure.
Figure 6:
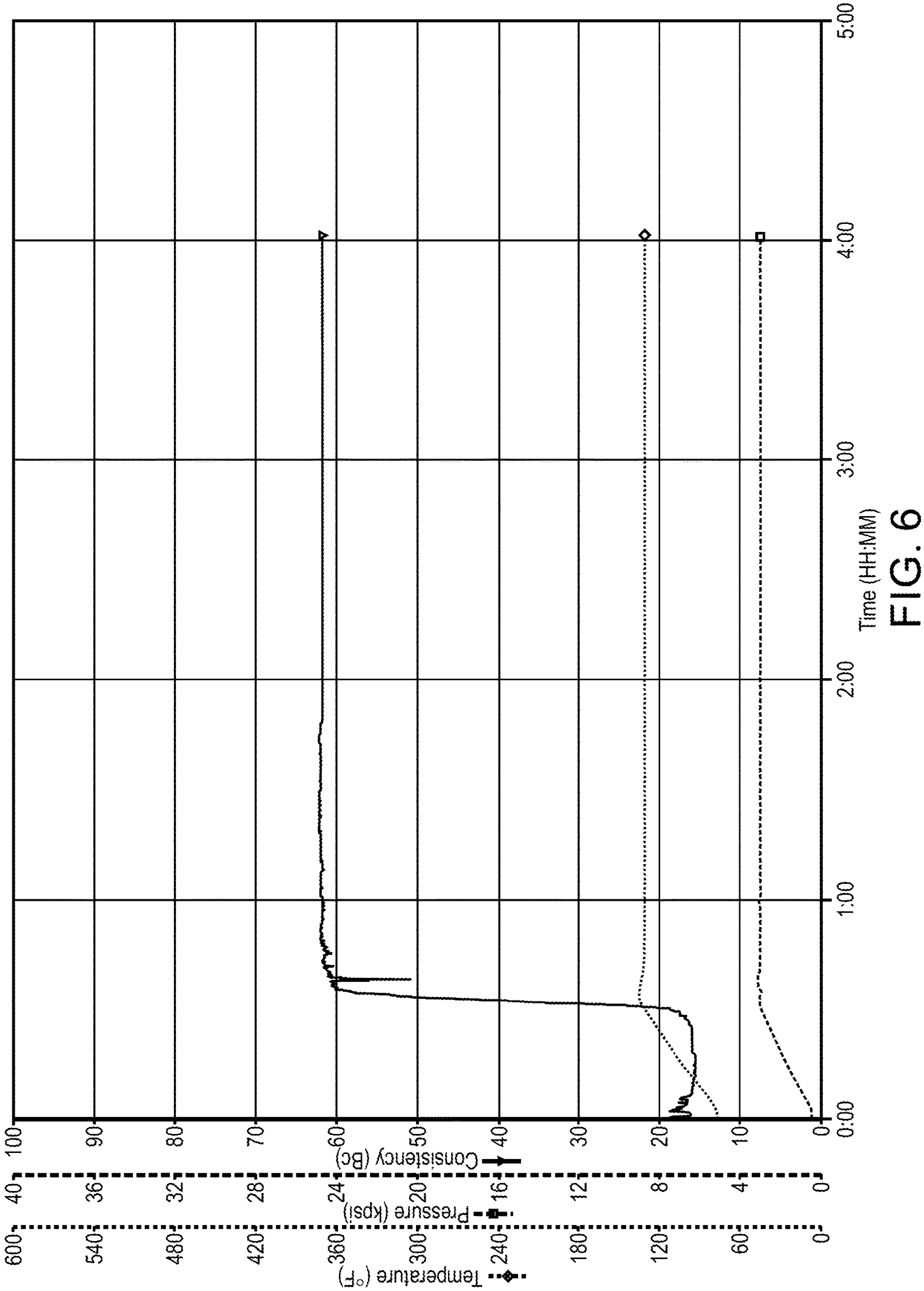
FIG. 6 is a plot showing a thickening time test result for a slurry according to certain embodiments of the present disclosure.

The thickening time results for Slurry 1 and Slurry 2 are shown in FIGS. 5 and 6, respectively. Other tested parameters of Slurry 1 and Slurry 2 are shown in Tables 4 and 5, respectively.

TABLE 4

Slurry 1 Results

| Parameter | Value |
|---|---|
| $B_c$ Final | 100 |
| Thickening Time | 1:15 (hr.:min.) |
| BHCT† | 130° F. |
| Pressure | 3000 psi |
| Test Temperature | 130° F. |
| Ramp Time | 30 min |

†Bottomhole circulating temperature

TABLE 5

Slurry 2 Results

| Parameter | Value |
|---|---|
| $B_c$ Final | 62 |
| Thickening Time | 4 hr. |
| BHCT† | 130° F. |
| Pressure | 3000 psi |
| Test Temperature | 130° F. |
| Ramp Time | 30 min. |
| Fluid loss (in 30 min.) | 20 mL |

†Bottomhole circulating temperature

The results demonstrate that the slurries were acceptable for oil and gas well cementing applications.

Embodiments

Certain embodiments of the present disclosure are provided in the following list:

Embodiment 1. A cementing fluid composition comprising:

a latex comprising a first polymer and a second polymer dispersed in water, wherein:

the first polymer comprises at least about 80 mol % polyvinyl acetate; and the second polymer is derived from styrene and butadiene, and has the general structure:

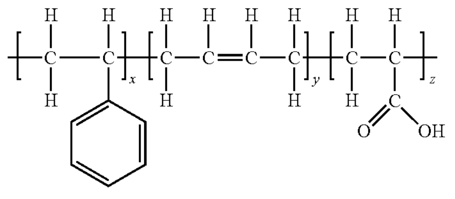

wherein:

a sum of x, y, and z is equal to s, x is about 20% to about 30% of s, y is about 70% to about 80% of s, and z is 0% to about 2% of s; and a cement, wherein a concentration of the cement in the cementing fluid composition is about 50 wt % to about 80 wt %, and a concentration of the latex in the cementing fluid composition is about 1 wt % to about 15 wt %.

Embodiment 2. The cementing fluid composition of embodiment 1, wherein a molar concentration of polyvinyl alcohol in the first polymer is less than about 5 mol % of polyvinyl alcohol.

Embodiment 3. The cementing fluid composition of embodiment 1, wherein the first polymer is substantially free from polyvinyl alcohol.

Embodiment 4. The cementing fluid composition of any one of embodiments 1-3, wherein a molar ratio of the first polymer to the second polymer in the cementing fluid composition is less than about 1.

Embodiment 5. The cementing fluid composition of embodiment 4, wherein a molar ratio of the first polymer to the second polymer in the cementing fluid composition is about 1:1.5 to about 1:5.

Embodiment 6. The cementing fluid composition of any one of embodiments 1-5, wherein z is 0% to about 0.5% of s.

Embodiment 7. The cementing fluid composition of any one of embodiments 1-5, wherein z is 0% of s.

Embodiment 8. The method of any one of embodiments 1-7, wherein a concentration of the latex in the cementing fluid is about 4 wt % to about 12 wt %.

Embodiment 8. The cementing fluid composition of any one of embodiments 1-7, wherein the cement comprises calcium oxide, silicon dioxide, aluminum oxide, iron oxide, and gypsum.

Embodiment 9. The cementing fluid composition of any one of embodiments 1-8, wherein a concentration of the cement in the cementing fluid is about 60 wt % to about 75 wt %.

Embodiment 10. The cementing fluid composition of any one of embodiments 1-9, further comprising an additive comprising a starch, a cellulosic polymer, a dispersant, set retarder, silica, a fluid loss additive, an expanding additive, or any combination thereof.

Embodiment 11. A method comprising:

providing a first polymer comprising at least about 80 mol % polyvinyl acetate;

providing a second polymer having the general structure:

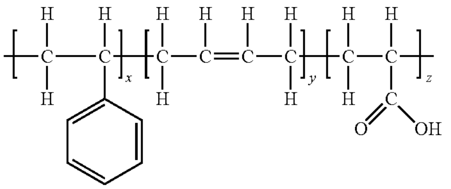

wherein:

a sum of x, y, and z is equal to s, x is about 20% to about 30% of s, y is about 70% to about 80% of s, and z is 0% to about 2% of s; and mixing the first polymer and the second polymer with a cement to form a cementing fluid.

Embodiment 12. The method of embodiment 11, wherein a molar concentration of polyvinyl alcohol in the first polymer is less than about 5 mol % of polyvinyl alcohol.

Embodiment 13. The method of embodiment 11 or embodiment 12, wherein providing the first polymer does not comprise hydrolysis of polyvinyl acetate into polyvinyl alcohol.

Embodiment 14. The method of any one of embodiments 11-13, wherein a molar ratio of the first polymer to the second polymer in the cementing fluid composition is less than about 1.

Embodiment 15. The method of any one of embodiments 11-13, wherein z is 0% to about 0.5% of s.

Embodiment 16. The method of any one of embodiments 11-15, wherein providing the second polymer does not comprise carboxylation of a styrene-butadiene polymer.

Embodiment 17. The method of embodiments 11-16, wherein a combined concentration of the first polymer and the second polymer in the cementing fluid is about 1 wt % to about 15 wt %.

Embodiment 18. The method of any one of embodiments 11-17, wherein a concentration of the cement in the cementing fluid is about 50 wt % to about 80 wt %.

Embodiment 19. The method of any one of embodiments 11-18, wherein the cement comprises calcium oxide, silicon dioxide, aluminum oxide, iron oxide, and gypsum.

Embodiment 20. The method of any one of embodiments 11-19, further comprising mixing an additive with the first polymer, second polymer, and cement to form the cementing fluid, wherein the additive comprises a starch, a cellulosic polymer, a dispersant, set retarder, silica, a fluid loss additive, an expanding additive, or any combination thereof.

Embodiment 21. A method of cementing a wellbore, comprising:

flowing the cementing fluid composition of any one of embodiments 11-20 through a tubular placed within a wellbore formed in a subterranean formation;

flowing a displacement fluid through the tubular, thereby displacing the cementing fluid to at least partially fill an annular space defined between the tubular and the wellbore; and allowing the cementing fluid to harden in the annular space defined between the tubular and the wellbore.

Other embodiments are also within the scope of the following claims.

The invention claimed is:

1. A cementing fluid composition comprising:

a latex comprising a first polymer and a second polymer dispersed in water, wherein:

the first polymer comprises at least about 80 mol % polyvinyl acetate; and the second polymer is derived from styrene and butadiene, and has the general structure:

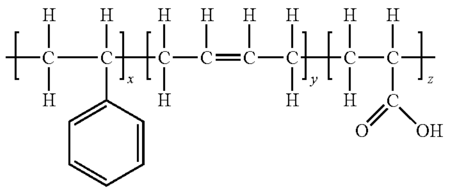

wherein:
- a sum of x, y, and z is equal to s,
- x is about 20% to about 30% of s,
- y is about 70% to about 80% of s, and
- z is 0.1% to about 2% of s; and a cement, wherein a concentration of the cement in the cementing fluid composition is about 50 wt % to about 80 wt %, and a concentration of the latex in the cementing fluid composition is about 1 wt % to about 15 wt %; and wherein a hydrophilic portion of the first polymer and the second polymer are attracted to the water and a hydrophobic portion of the second polymer forms a film barrier, and the first polymer and the second polymer interact with cement hydration products to form a semi-permeable membrane.

2. The cementing fluid composition of claim 1, wherein a molar concentration of polyvinyl alcohol in the first polymer is less than about 5 mol % of polyvinyl alcohol.

3. The cementing fluid composition of claim 1, wherein the first polymer is substantially free from polyvinyl alcohol.

4. The cementing fluid composition of claim 1, wherein a molar ratio of the first polymer to the second polymer in the cementing fluid composition is less than about 1.

5. The cementing fluid composition of claim 4, wherein a molar ratio of the first polymer to the second polymer in the cementing fluid composition is about 1:1.5 to about 1:5.

6. The cementing fluid composition of claim 1, wherein z is 0.1% to about 0.5% of s.

7. The cementing fluid compositionmethod of claim 1, wherein a concentration of the latex in the cementing fluid is about 4 wt % to about 12 wt %.

8. The cementing fluid composition of claim 1, wherein a concentration of the cement in the cementing fluid is about 60 wt % to about 75 wt %.

9. The cementing fluid composition of claim 1, further comprising an additive comprising a starch, a cellulosic polymer, a dispersant, set retarder, silica, a fluid loss additive, an expanding additive, or any combination thereof.

10. The cementing fluid composition of claim 1, wherein the cement comprises calcium oxide, silicon dioxide, aluminum oxide, iron oxide, and gypsum.

11. A method comprising:

providing a first polymer comprising at least about 80 mol % polyvinyl acetate;

providing a second polymer having the general structure:

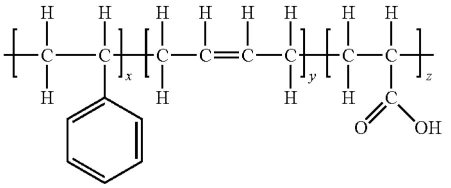

wherein:
- a sum of x, y, and z is equal to s,
- x is about 20% to about 30% of s,
- y is about 70% to about 80% of s, and
- z is 0.1% to about 2% of s; and mixing the first polymer and the second polymer with a cement to form a cementing fluid; and wherein a hydrophilic portion of the first polymer and the second polymer are attracted to the water and hydrophobic portions of the second polymer forms a film barrier, and the first polymer and the second polymer interact with cement hydration products to form a semi-permeable membrane.

12. The method of claim 11, wherein a molar concentration of polyvinyl alcohol in the first polymer is less than about 5 mol % of polyvinyl alcohol.

13. The method of claim 11, wherein providing the first polymer does not comprise hydrolysis of polyvinyl acetate into polyvinyl alcohol.

14. The method of claim 11, wherein a molar ratio of the first polymer to the second polymer in the cementing fluid composition is less than about 1.

15. The method of claim 11, wherein z is 0.1% to about 0.5% of s.

16. The method of claim 11, wherein providing the second polymer does not comprise carboxylation of a styrene-butadiene polymer.

17. The method of claim 11, wherein a combined concentration of the first polymer and the second polymer in the cementing fluid is about 1 wt % to about 15 wt %.

18. The method of claim 11, wherein a concentration of the cement in the cementing fluid is about 50 wt % to about 80 wt %.

19. The method of claim 11, wherein the cement comprises calcium oxide, silicon dioxide, aluminum oxide, iron oxide, and gypsum.

20. The method of claim 11, further comprising mixing an additive with the first polymer, second polymer, and cement to form the cementing fluid, wherein the additive comprises a starch, a cellulosic polymer, a dispersant, set retarder, silica, a fluid loss additive, an expanding additive, or any combination thereof.

21. A method of cementing a wellbore, comprising:

flowing the cementing fluid composition of claim 11 through a tubular placed within a wellbore formed in a subterranean formation;

flowing a displacement fluid through the tubular, thereby displacing the cementing fluid to at least partially fill an annular space defined between the tubular and the wellbore; and allowing the cementing fluid to harden in the annular space defined between the tubular and the wellbore.

* * * * *